US012326245B1

(12) United States Patent
Zheng

(10) Patent No.: US 12,326,245 B1
(45) Date of Patent: Jun. 10, 2025

(54) DOWNLIGHT WITH ADJUSTABLE COLOR TEMPERATURE

(71) Applicant: JOININ GLOBAL PTE. LTD., Singapore (SG)

(72) Inventor: Hongbing Zheng, Singapore (SG)

(73) Assignee: JOININ GLOBAL PTE. LTD., Singapore (SG)

(*) Notice: Subject to any disclaimer, the term of this patent is extended or adjusted under 35 U.S.C. 154(b) by 0 days.

(21) Appl. No.: 18/816,340

(22) Filed: Aug. 27, 2024

(51) Int. Cl.
*F21V 23/04* (2006.01)
*F21S 8/02* (2006.01)
*F21V 7/04* (2006.01)

(52) U.S. Cl.
CPC ............. *F21V 23/04* (2013.01); *F21S 8/026* (2013.01); *F21V 7/04* (2013.01)

(58) Field of Classification Search
CPC .. F21S 8/026; F21S 8/024; F21S 8/022; F21S 8/02; F21V 23/04
See application file for complete search history.

(56) References Cited

U.S. PATENT DOCUMENTS 10,683,969 B2 * 6/2020 Jeswani ............... H05B 45/385
10,893,587 B2 * 1/2021 Halliwell ............... H05B 45/10
11,384,910 B1 * 7/2022 Cohen ................... F21V 29/777
12,000,576 B1 * 6/2024 Lee ....................... F21V 23/005
12,025,293 B2 * 7/2024 Li ....................... F21V 23/0464
2018/0206305 A1 * 7/2018 Van Winkle ............ F21S 8/026
2019/0318697 A1 * 10/2019 Kumar .................... F21V 21/14
2021/0140613 A1 * 5/2021 Huang .................. F21V 21/041
2021/0364140 A1 * 11/2021 Chen ....................... F21V 21/03
2022/0003397 A1 * 1/2022 Zhang ....................... F21V 3/00
2022/0307659 A1 * 9/2022 Cohen ................. F21V 23/0464
2023/0258306 A1 * 8/2023 Smith .................. F21V 23/008
362/157

* cited by examiner

*Primary Examiner* — William N Harris
(74) *Attorney, Agent, or Firm* — Schwegman Lundberg & Woessner, P.A.

(57) ABSTRACT

A downlight with adjustable color temperature, which includes a body, the body being in a cylindrical structure with an end communicated with outside, an annular lamp panel being provided at an opening side of the body, and a groove being provided at an end wall of an inner ring of the body along an axial direction of the body. The groove is arranged at an inner side of the body and a boss is arranged on an outer side of a tapered barrel, and relative rotation of the tapered barrel and the body is realized by embedded connection between the boss and the groove. A shift lever is arranged on a back of the reflective cup, and the dial handle can be clamped and fixed through the U-shaped groove, and the dial handle is placed transversely, so that an arc rotation trajectory of the dial handle can be enlarged.

12 Claims, 8 Drawing Sheets

DOWNLIGHT WITH ADJUSTABLE COLOR TEMPERATURE

TECHNICAL FIELD

The disclosure belongs to the technical field of light fixtures, in particular to a downlight with adjustable color temperature.

BACKGROUND ART

A LED downlight is a kind of downward lighting fixture embedded in a ceiling, which is generally installed on a surrounding ceiling of a bedroom, a living room or a bathroom. Different light sources, light guide plates and diffuser plates can be used to achieve different light effects. Downlights do not occupy space, which can increase soft atmosphere of space. If a warm feeling is desired, more downlights can be installed to reduce oppressive sense of space.

Currently, most of LED downlights on the market are installed in an embedded mode, and because of their circuit schemes, a color temperature dial switch can only be designed on a back of a body, and thus an adjusting device is also designed on the back of the body accordingly. After embedded installation of the body is completed, the body needs to be taken out so as to adjust the color temperature again, which is less convenient.

Therefore, in view of above problems, it is urgent to design a downlight which is convenient for operators to adjust the color temperature quickly.

SUMMARY

An object of the disclosure is to provide a downlight with adjustable color temperature, so as to solve a problem of inconvenient operation of adjusting the color temperature of the lamp tube in above background art section. A technical scheme is provided as follows: a downlight with adjustable color temperature includes:

a body, an end of which is recessed to form an accommodating space;

a light board provided in the accommodating space of the body;

a tapered barrel provided inside the body, a side wall of the tapered barrel being everted in a radial direction at a large-diameter opening to form an outer-edge ring part, and the light board being located at a small-diameter opening at the side wall of the tapered barrel; an inner wall of the body being provided with a groove, and a boss being provided at a ring end of the outer-edge ring part, and the boss being embedded in the groove; and the outer-edge ring part being provided with raised parts which facilitate rotation of the tapered barrel, the raised parts being arranged in pairs, and each pair of raised parts being arranged oppositely at 180 degrees; wherein an opening at the larger-diameter side of the tapered barrel is the large-diameter opening, while an opening at the smaller-diameter side is the small-diameter opening;

opaque reflective paper being provided in the side wall of the tapered barrel to reflect a light beam emitted by the light board to the diffuser plate;

a shift lever provided on the side wall of the tapered barrel;

a color temperature dial switch provided in the accommodating space of the body, and a first end of the shift lever being connected with the color temperature dial switch; and a diffuser plate installed at the large-diameter side of the tapered barrel and located within the outer-edge ring part.

By rotating the outer-edge ring part, the tapered barrel can drive the shift lever to toggle the color temperature dial switch, so as to realize adjustment of the color temperature of the downlight.

In this technical scheme, the object of the disclosure is to provide a downlight, which changes a position and form of an original color temperature dial switch on the market and is convenient for consumers to adjust the color temperature before and after installation of the body.

The tapered barrel is integrally formed by injection molding in which a transparent, semi-transparent or opaque material can be selected to realize reflection effect, which increases diversity of light-emitting forms and meets requirements of different light-emitting effect and light-emitting areas of the light board.

The boss is arranged on the outer side of the tapered barrel, and the boss is clamped with the groove to realize fixed connection with the body. This installation model does not need screw fit, which is with low cost and is simple. A back of the tapered barrel is provided with the shift lever, and this structure can be fixed with a dial handle in the color temperature dial switch in an embedded manner. When the tapered barrel is manually rotated by an operator, the color temperature dial switch can be driven to slide left and right, thus realizing adjustment of the color temperature of the light fixture.

Because the tapered barrel and the shift lever are integrally fixed, the shift lever is aligned with the dial handle at first, and then the tapered barrel is pressed until the boss is buckled into the groove to realize installation with the body, and a lower end of the tapered barrel abuts against a bottom of the body after the installation. In addition, the outer-edge ring part is designed on a front of the tapered barrel, and the raised parts are evenly distributed on a upper surface of the outer-edge ring part to increase an contact area with a hand so as to increase friction, and thus it is convenient for a user to rotate the tapered barrel to drive the shift lever to adjust a position of the color temperature dial switch to realize the adjustment of the color temperature, and there are at least two pairs of raised parts provided, and an interval of at least 180 degrees is kept for each pair.

In any of above technical schemes, further, a first end of the shift lever is defined with a U-shaped groove, and two ends of the U-shaped groove are respectively provided with a guide inclined surface to facilitate clamping of the color temperature dial switch into the U-shaped groove.

The color temperature dial switch is provided with a dial handle extending horizontally along a radial direction of the downlight, and the shift lever extends vertically along an axial direction of the downlight, and the dial handle can be embedded in the U-shaped groove.

In this technical scheme, during installation of the tapered barrel, in order to more accurately realize clamping between the shift lever and the color temperature dial switch, an extension direction of the shift lever is perpendicular to an extension direction of the dial handle (the dial handle is placed horizontally, and the shift lever is fixed from top to bottom during installation), thus increasing an arc rotation trajectory of the dial handle, and left-right sliding of the color temperature dial switch can be more effectively realized by rotating the shift lever. The guide inclined surface is respectively provided at two sides of the U-shaped groove, which can ensure that the dial handle can be quickly buckled into the U-shaped groove along the guide inclined surfaces to realize fixing.

In any of the above technical schemes, the raised part located at the upper surface of the outer-edge ring part, can also be structured such that a first end part of the raised part extends beyond the outer-edge ring part and bends upwards. This design allows for easy hand contact and grip by the user, and thus it is convenient for the user to rotate the tapered barrel to drive the shift lever to adjust a position of the color temperature dial switch to realize the adjustment of the color temperature. Specifically, the first end part is arranged adjacent to the first wall, and an inclination of the first end part is consistent with an inclination of the first wall of the body, so that the integrity between the raised part and the body is better and the appearance is simpler.

In any of the above technical schemes, further, a clamping groove is provided at an inner wall of the large-diameter opening at the side wall of the tapered barrel, and the diffuser plate is clamped in the clamping groove. A diameter of the diffuser plate is smaller than an inner diameter of the clamping groove, so that the diffuser plate and the tapered barrel can rotate relative to each other.

In this technical scheme, the clamping groove is formed at a periphery of an inner ring of the tapered barrel, and the diffuser plate is buckled with the clamping groove to realize installation with the tapered barrel. Advantages of this fixed structure are that the diffuser plate does not need an injection molding process and is with low cost; moreover, the diffuser plate and the tapered barrel can be moved relative to each other, and the user can adjust the color temperature only by rotating a reflective cup.

The disclosure has following beneficial effects that the groove is arranged at the inner side of the body and the boss is arranged on the outer side of the tapered barrel, and relative rotation of the tapered barrel and the body is realized by embedded connection between the boss and the groove. At least two pairs of friction area groups are provided on the outer-edge ring part to facilitate the user to manually rotate the tapered barrel. The shift lever is arranged on the back of the reflective cup, and the dial handle can be clamped in the fixed structure through the U-shaped groove, and the dial handle is placed transversely, and the fixed structure is fixed from top to bottom, so that the arc rotation trajectory of the dial handle can be enlarged, which is convenient for operators to adjust the color temperature by rotating the tapered barrel. The groove is provided at an inner side of the reflective cup for fastening the diffuser plate, and the diffuser plate does not need the injection molding process, thus with low cost.

Figure 1:
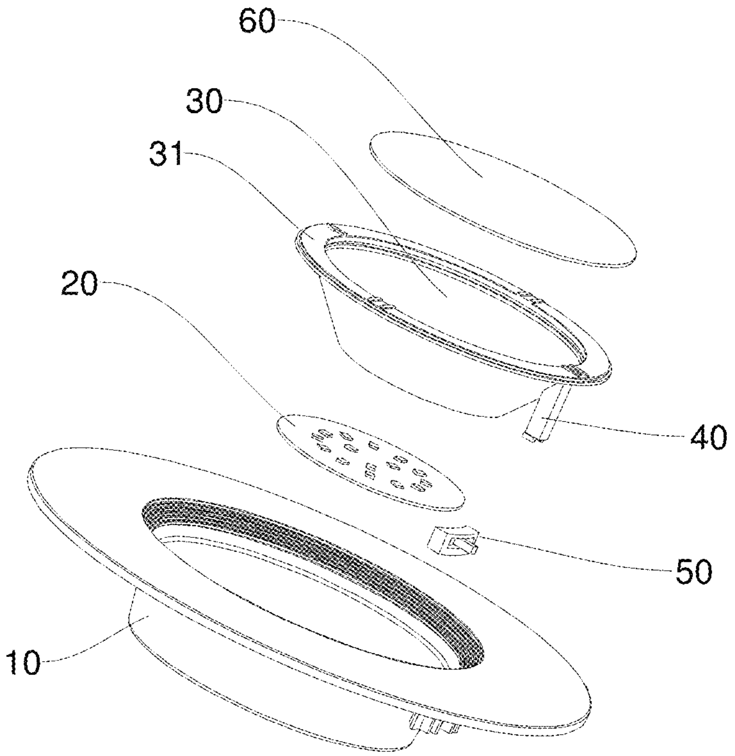
FIG. 1 is an exploded view of a downlight according to the disclosure.

Reference numbers in the figure are as follows. 10. Body; 11. First Wall; 12. Groove; 20. Light Board; 30. Tapered Barrel; 31. Outer-edge Ring Part; 32. Boss; 33. Raised Part; 34. Clamping Groove; 35. First End Part; 40. Shift Lever; 41. U-shaped Groove; 42. Guide Inclined Surface; 50. Color Temperature Dial Switch; 51. Dial Handle; 60. Diffuser Plate.

DETAILED DESCRIPTION

In the following, technical schemes in the embodiments of the disclosure will be described clearly in connection with the drawings; obviously, described embodiments is intended to be only a part of embodiments of the disclosure, but not all of them. On a basis of the embodiments in this disclosure, all other embodiments obtained by the ordinary skilled in the art are within the protection scope of this disclosure.

In description of this disclosure, it should be noted that terminologies used herein is only for describing specific embodiments and is not intended to limit exemplary embodiments according to this disclosure. For convenience of description, dimensions of various parts shown in the drawings are not drawn according to an actual scale relationship. Techniques, methods and devices known to ordinary skilled in relevant art may not be discussed in detail, but in appropriate cases, the techniques, methods and devices should be regarded as a part of the authorized specification. In all examples shown and discussed herein, any specific value should be interpreted to be illustrative only, but not as limitation. Therefore, other examples of exemplary embodiments may have different values. It should be noted that similar reference numbers and letters indicate similar items in the following figures, and thus once an item is defined in one figure, it is not necessary to be further discussed in the following figures.

Embodiment 1

As shown in FIGS. 1 to 4, a downlight with adjustable color temperature is provided in this embodiment, which includes:

- a body 10, an end of which is recessed to form an accommodating space;
- a light board 20 provided in the accommodating space of the body 10; and
- a tapered barrel 30 provided inside the body 10, a side wall of the tapered barrel 30 being everted in a radial direction at a large-diameter opening to form an outer-edge ring part 31, and the light board 20 being located at a small-diameter opening at the side wall of the tapered barrel 30; an inner wall of the body 10 being provided with a groove 12, and a boss 32 being provided at a ring end of the outer-edge ring part 31, and the boss 32 being embedded in the groove 12; and the outer-edge ring part 31 being provided with raised parts 33 which facilitate rotation of the tapered barrel 30. the raised parts 33 being arranged in pairs, and each pair of raised parts 33 being arranged oppositely at 180 degrees;
- opaque reflective paper being provided in the side wall of the tapered barrel 30 to reflect a light beam emitted by the light board to the diffuser plate 60;
- a shift lever 40 provided on the side wall of the tapered barrel 30;

a color temperature dial switch 50 provided in the accommodating space of the body 10, and a first end of the shift lever 40 being connected with the color temperature dial switch 50; and a diffuser plate 60 installed at a large-diameter side of the tapered barrel 30 and located within the outer-edge ring part 31.

By rotating the outer-edge ring part 31, the tapered barrel 30 can drive the shift lever 40 to toggle the color temperature dial switch 50, so as to realize adjustment of the color temperature of the downlight.

In this technical scheme, the object of the disclosure is to provide a downlight, which changes a position and form of an original color temperature dial switch on the market and is convenient for consumers to adjust the color temperature before and after installation of the body.

The tapered barrel 30 is integrally formed by injection molding in which a transparent, semi-transparent or opaque material can be selected to realize reflection effect, which increases diversity of light-emitting forms and meets requirements of different light-emitting effect and light-emitting areas of the light board 20.

The boss 30 is arranged on the outer side of the tapered barrel 32, and the boss 32 is clamped with the groove 12 to realize fixed connection with the body 10. This installation model does not need screw fit, which is with low cost and is simple. A back of the tapered barrel 30 is provided with the shift lever 40, and this structure can be fixed with a dial handle 51 in the color temperature dial switch 50 in an embedded manner. When the tapered barrel 30 is manually rotated by an operator, the color temperature dial switch 50 can be driven to slide left and right, thus realizing adjustment of the color temperature of the light fixture.

Because the tapered barrel 30 and the shift lever 40 are integrally fixed, the shift lever 40 is aligned with the dial handle 51 at first, and then the tapered barrel 30 is pressed until the boss 32 is buckled into the groove 12 to realize installation with the body 10, and a lower end of the tapered barrel 30 abuts against a bottom of the body 10 after the installation. In addition, the outer-edge ring part 31 is designed on a front of the tapered barrel 30, and the raised parts 33 are evenly distributed on a upper surface of the outer-edge ring part 31 to increase an contact area with a hand so as to increase friction, and thus it is convenient for a user to rotate the tapered barrel 30 to drive the shift lever 40 to adjust a position of the color temperature dial switch 50 to realize the adjustment of the color temperature, and there are at least two pairs of raised parts 33 provided, and an interval of at least 180° is kept for each pair.

In a preferred embodiment of the disclosure:

As shown in FIGS. 4 to 7, specifically, a first end of the shift lever 40 is defined with a U-shaped groove 41, and two ends of the U-shaped groove 41 are respectively provided with a guide inclined surface 42 to facilitate clamping of the color temperature dial switch 50 into the U-shaped groove 41.

The color temperature dial switch 50 is provided with a dial handle 51 extending horizontally along a radial direction of the downlight, and the shift lever 40 extends vertically along an axial direction of the downlight, and the dial handle 51 can be embedded in the U-shaped groove 41.

In this technical scheme, during installation of the tapered barrel 30, in order to more accurately realize clamping between the shift lever 40 and the color temperature dial switch 50, an extension direction of the shift lever 40 is perpendicular to an extension direction of the dial handle 51 (the dial handle 51 is placed horizontally, and the shift lever 40 is fixed from top to bottom during installation), thus increasing an arc rotation trajectory of the dial handle 51, and left-right sliding of the color temperature dial switch 50 can be more effectively realized by rotating the shift lever 40. The guide inclined surface 42 is respectively provided at two sides of the U-shaped groove 41, which can ensure that the dial handle 51 can be quickly buckled into the U-shaped groove 41 along the guide inclined surfaces 42 to realize fixing.

Figure 2:
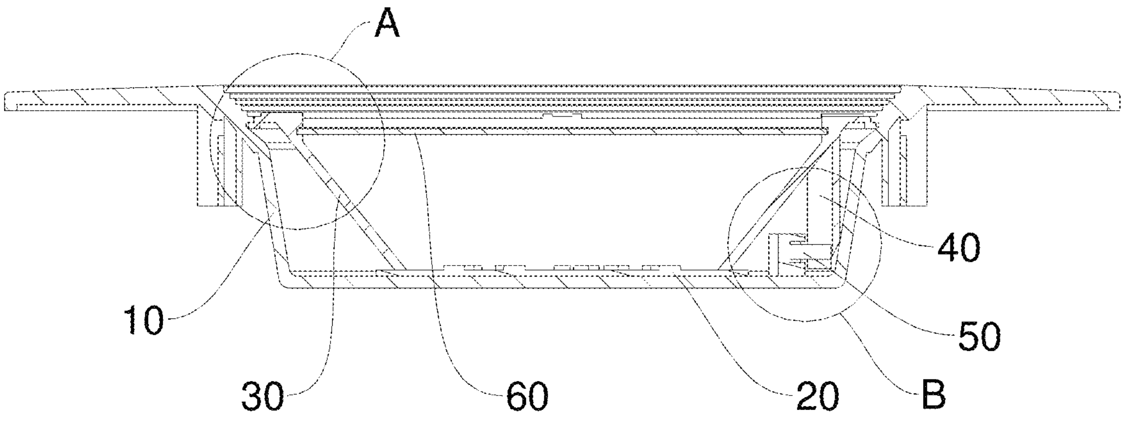
FIG. 2 is a schematic view of an internal structure of a downlight according to the disclosure.
Figure 3:
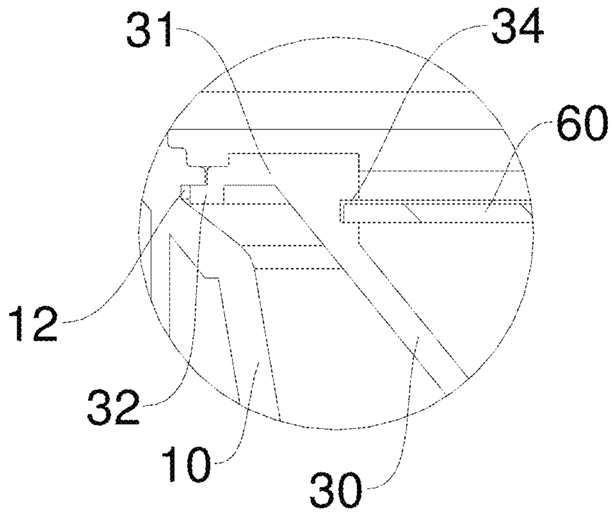
FIG. 3 is an enlarged schematic view at A in FIG. 2.
Figure 4:
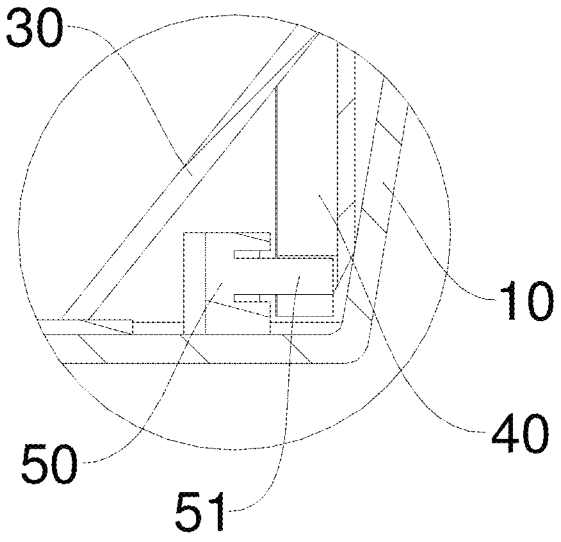
FIG. 4 is an enlarged schematic view at B in FIG. 2.
Figure 5:
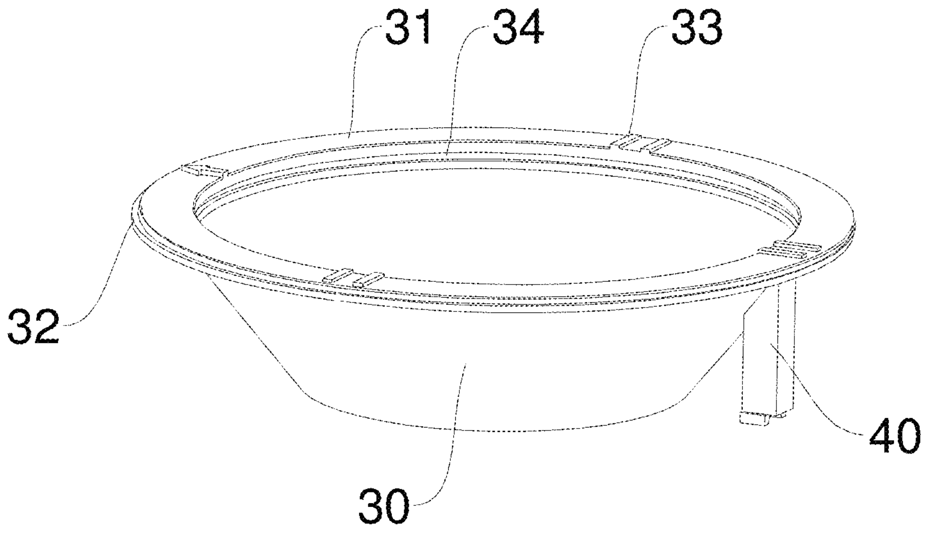
FIG. 5 is a three-dimensional schematic view of a tapered barrel according to the disclosure.
Figure 6:
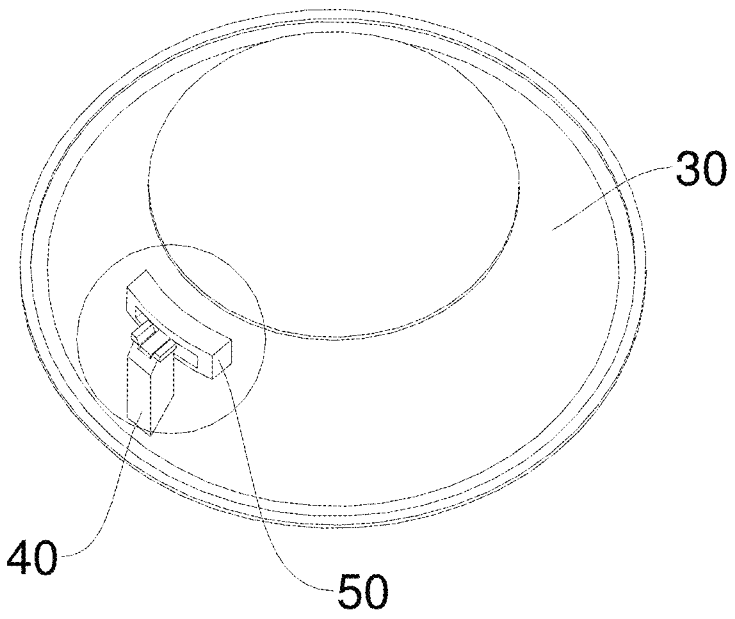
FIG. 6 is a three-dimensional schematic view of a bottom of the tapered barrel according to the disclosure.
Figure 7:
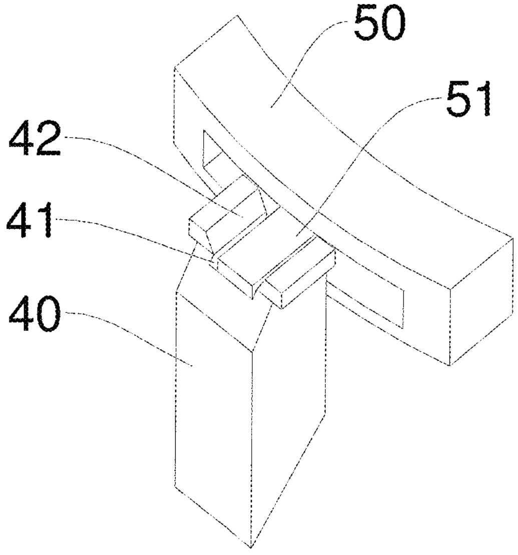
FIG. 7 is a schematic view of installation of a shift lever and a color temperature dial switch according to the disclosure.

In a preferred embodiment of the disclosure:

As shown in FIGS. 2 to 3, specifically, a clamping groove 34 is provided at an inner wall of the large-diameter opening at the side wall of the tapered barrel 30, and the diffuser plate 60 is clamped in the clamping groove 34. A diameter of the diffuser plate 60 is smaller than an inner diameter of the clamping groove 34, so that the diffuser plate 60 and the tapered barrel 30 can rotate relative to each other.

In this technical scheme, the clamping groove 34 is formed at a periphery of an inner ring of the tapered barrel 30, and the diffuser plate 60 is buckled with the clamping groove 34 to realize installation with the tapered barrel 30. Advantages of this fixed structure are that the diffuser plate 60 does not need an injection molding process and is with low cost; moreover, the diffuser plate 60 and the tapered barrel 30 can be moved relative to each other, and the user can adjust the color temperature only by rotating a reflective cup.

Figure 8:
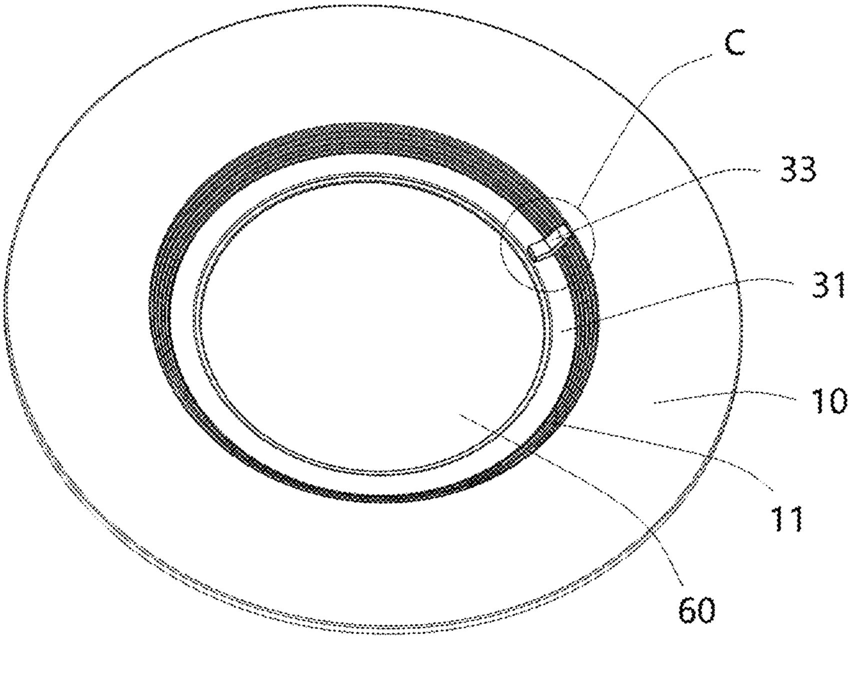
FIG. 8 is a schematic view of another embodiment of a downlight according to the disclosure.
Figure 9:
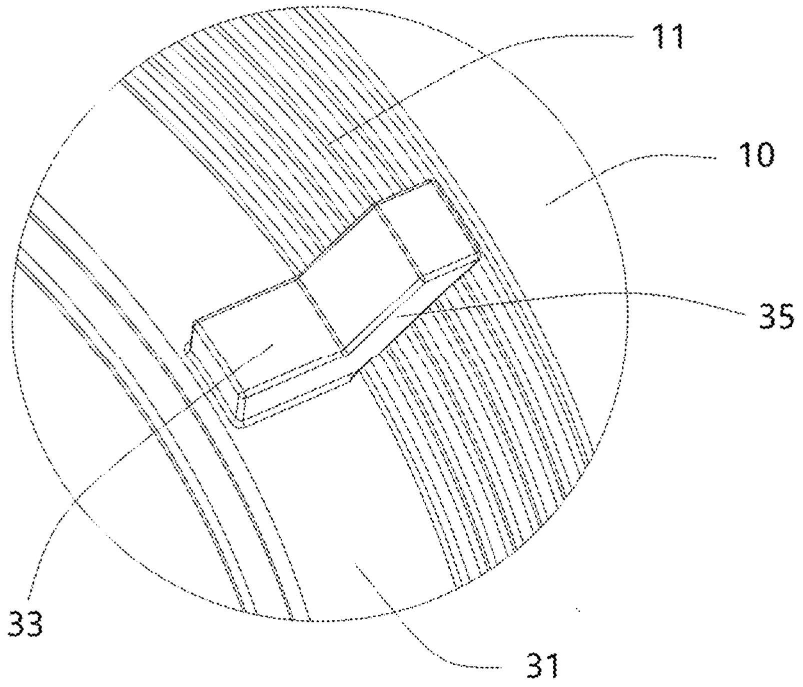
FIG. 9 is an enlarged schematic view at C in FIG. 8.

In a preferred embodiment of the disclosure:

As shown in FIGS. 8 to 9, the raised part 33 located at the upper surface of the outer-edge ring part 31 can also be a structure with a first end part 35 extends beyond the outer-edge ring part 31 and bends upwards. This design allows for easy hand contact and grip by the user, and thus it is convenient for the user to rotate the tapered barrel 30 to drive the shift lever 40 to adjust a position of the color temperature dial switch 50 to realize the adjustment of the color temperature.

Specifically, the body 10 has a first wall 11, the first end part 35 is arranged adjacent to the first wall 11 of the body 10, and an inclination of the first end part 35 is consistent with an inclination of the first wall 11 of the body 10, so that the integrity between the raised part 33 and the body 10 is better and the appearance is simpler.

Embodiments of this disclosure have been described above in combination with drawings. In case of no conflict, embodiments and features in the embodiments can be combined with each other. This disclosure is not limited to above specific embodiments, which are only schematic but not restrictive. Under inspiration of this disclosure, many forms can be made by ordinary skilled in the art without departing from the spirit of this disclosure and the protection scope of the claims, which all fall within the protection of this disclosure.

What is claimed is:

1. A downlight with adjustable color temperature, comprising:

a body, an end of which is recessed to form an accommodating space;

a light board provided in the accommodating space of the body;

a tapered barrel provided inside the body, an opening at the larger-diameter side of the tapered barrel is a large-diameter opening, while an opening at the smaller-diameter side is a small-diameter opening; a side wall of the tapered barrel being everted in a radial direction at the large-diameter opening to form an outer-edge ring part, and the light board being located at the small-diameter opening at the side wall of the tapered barrel;

a shift lever provided on the side wall of the tapered barrel;

a color temperature dial switch provided in the accommodating space of the body, and a first end of the shift lever being connected with the color temperature dial switch; and a diffuser plate installed at the large-diameter side of the tapered barrel and located within the outer-edge ring part; wherein by rotating the outer-edge ring part, the tapered barrel drives the shift lever to toggle the color temperature dial switch, so as to realize adjustment of the color temperature of the downlight.

2. The downlight with adjustable color temperature according to claim 1, wherein the outer-edge ring part is provided with a raised part which facilitate rotation of the tapered barrel.

3. The downlight with adjustable color temperature according to claim 2, wherein there are multiple raised parts, the multiple raised parts are arranged in pairs, and each pair of raised parts being arranged oppositely at 180 degrees.

4. The downlight with adjustable color temperature according to claim 1, wherein the tapered barrel is made of a transparent material.

5. The downlight with adjustable color temperature according to claim 1, wherein opaque reflective paper is provided in the side wall of the tapered barrel to reflect a light beam emitted by the light board to the diffuser plate.

6. The downlight with adjustable color temperature according to claim 1, wherein an inner wall of the body is provided with a groove, and a boss is provided at a ring end of the outer-edge ring part, and the boss is embedded in the groove.

7. The downlight with adjustable color temperature according to claim 1, wherein a clamping groove is provided at an inner wall of the large-diameter opening at the side wall of the tapered barrel, and the diffuser plate is clamped in the clamping groove.

8. The downlight with adjustable color temperature according to claim 7, wherein a diameter of the diffuser plate is smaller than an inner diameter of the clamping groove, so that the diffuser plate and the tapered barrel rotate relative to each other.

9. The downlight with adjustable color temperature according to claim 1, wherein a first end of the shift lever is defined with a U-shaped groove, and two ends of the U-shaped groove are respectively provided with a guide inclined surface to facilitate clamping of the color temperature dial switch into the U-shaped groove.

10. The downlight with adjustable color temperature according to claim 9, wherein the color temperature dial switch is provided with a dial handle extending horizontally along a radial direction of the downlight, and the shift lever extends vertically along an axial direction of the downlight, and the dial handle is embedded in the U-shaped groove.

11. The downlight with adjustable color temperature according to claim 2, wherein a first end part of the raised part extends beyond the outer-edge ring part and bends upwards.

12. The downlight with adjustable color temperature according to claim 11, wherein the body is provided with a first wall, the first end part is arranged adjacent to the first wall, and an inclination of the first end part is consistent with an inclination of the first wall of the body.

* * * * *